US012717890B1

(12) United States Patent
Cron et al.

(10) Patent No.: US 12,717,890 B1
(45) Date of Patent: Aug. 25, 2026

(54) LOGIC BUILT-IN SELF-TEST (LBIST) CIRCUIT FOR AUTHENTICITY VALIDATION

(71) Applicant: Synopsys, Inc., Mountain View, CA (US)

(72) Inventors: Adam Cron, Hilton Head Island, SC (US); Michael Borza, Ottawa (CA)

(73) Assignee: Synopsys, Inc., Sunnyvale, CA (US)

( * ) Notice: Subject to any disclaimer, the term of this patent is extended or adjusted under 35 U.S.C. 154(b) by 551 days.

(21) Appl. No.: 18/306,093

(22) Filed: Apr. 24, 2023

(51) Int. Cl.
*G06F 21/44* (2013.01)
*G01R 31/3187* (2006.01)
*G06F 21/87* (2013.01)

(52) U.S. Cl.
CPC ......... *G06F 21/44* (2013.01); *G01R 31/3187* (2013.01); *G06F 21/87* (2013.01)

(58) Field of Classification Search
CPC ...... G06F 21/44; G06F 21/87; G01R 31/3187
See application file for complete search history.

(56) References Cited

U.S. PATENT DOCUMENTS 8,848,905 B1 * 9/2014 Hamlet ................. H04L 9/3278 726/20
9,208,352 B2 12/2015 Sella et al.
11,422,186 B1 * 8/2022 Waicukauski ............................... G01R 31/318536
2015/0227760 A1 * 8/2015 Sella ........................ G09C 5/00 726/30

* cited by examiner

*Primary Examiner* — Han Yang
(74) *Attorney, Agent, or Firm* — Davenport IP Law, PLLC

(57) ABSTRACT

An example is a method. A query challenging authenticity is received at an intellectual property (IP) block in an integrated circuit (IC) die. The query may be a query of a query-response pair. A response to the query is generated, at the IP block, using a logic built-in self-test (LBIST) circuit. The response is transmitted from the IP block. The response may be received and compared to an expected response of the query-response pair. Authenticity may be validated when the response matches the expected response.

20 Claims, 5 Drawing Sheets

LOGIC BUILT-IN SELF-TEST (LBIST) CIRCUIT FOR AUTHENTICITY VALIDATION

TECHNICAL FIELD

The present disclosure relates to using a logic built-in self-test (LBIST) circuit for validating authenticity of an integrated circuit (IC) die or circuit therein.

BACKGROUND

Built-in self-test (BIST) is an approach to testing functionality in an integrated circuit (IC). A BIST circuit may perform various tests within the IC to test functionality while the device is installed in the system in which it performs its normal mission-mode function. Logic BIST is an approach to testing functionality of logic circuits.

SUMMARY

An example is a method. A query challenging authenticity is received at an intellectual property (IP) block in an integrated circuit (IC) die. A response to the query is generated, at the IP block, using a logic built-in self-test (LBIST) circuit. The response is transmitted from the IP block.

Another example is a method. A query of a query-response pair for challenging authenticity is transmitted to an IP block in an IC die. A response to the query is received from the IP block. The response is generated at the IP block using an LBIST circuit of the IC die. The response is compared to an expected response of the query-response pair. Authenticity is validated when the response matches the expected response.

A further example is a method. A query of a query-response pair is transmitted to an IP block in an IC die. The query is received at the IP block. A response to the query is generated, at the IP block, using an LBIST circuit of the IC die. The response is received from the IP block. The response is compared to an expected response of the query-response pair.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
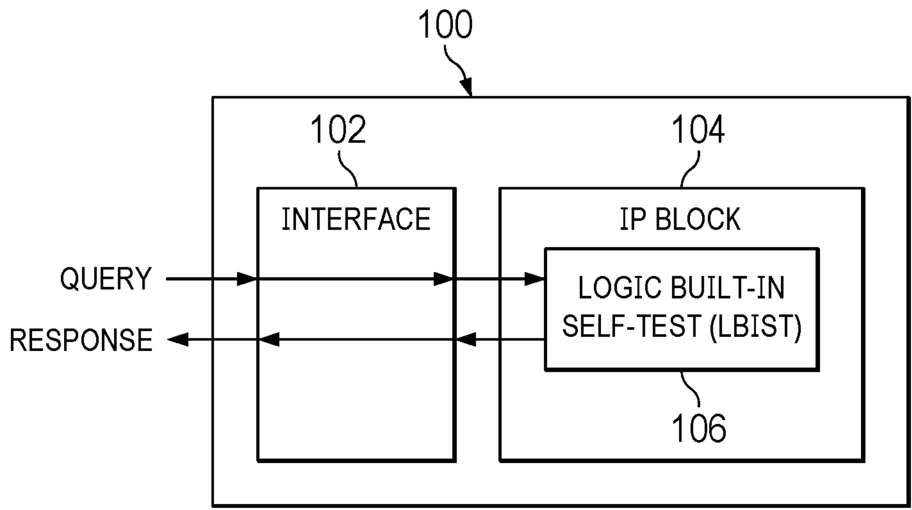
FIG. 1 is a schematic view of an integrated circuit (IC) die according to some examples.

Aspects of the present disclosure relate to implementing a logic built-in self-test (LBIST) circuit for authenticity validation. Design and manufacture of integrated circuits (ICs) currently is typically distributed. Because of this, ensuring authenticity of an IC die or intellectual property (IP) block fabricated in the IC die may be important to ensure that the IC die and/or IP block has the capabilities that it is believed to have and is authentic. With contract manufacturing being common, an IC may be easily recreated based on information gained from, e.g., an untrusted manufacturing vendor, or an IP block or IC may be modified or replaced by an untrusted manufacturing vendor.

Examples described herein include using an LBIST circuit for validating authenticity of an IC die and/or IP block within the IC die. Generally, a query of a query-response pair is transmitted to and received by an IP block in an IC die. An IP block in an IC die may be or include any circuit or portion thereof fabricated in the IC die, and the IP block may be configured to perform any functionality. A response to the query is generated at the IP block using the LBIST circuit. The response is transmitted from the IP block. The response is compared to an expected response of the query-response pair. Authenticity of the IP block and/or the IC die may be validated when the response matches the expected response. Authenticity of the IP block and/or the IC die may not be validated when the response does not match the expected response.

Technical advantages of the present disclosure include, but are not limited to, providing a mechanism by which authenticity of the IC die and/or IP block may be validated. The validation of authenticity may prevent hostile parties that have a low level of access to an IC die (e.g., merely physical access to a sample IC die) from providing an imitation product replicating the IC die. Additionally, the validation of authenticity may prevent a hostile party from inserting or modifying a circuit in an IP block on an IC die. The validation protocol implemented by the IC die and/or IP block may be latent in the IC die and/or IP block and not disclosed publicly, to vendors, or to purchasers. The validation protocol may be difficult, if not impossible, to replicate in an imitation or modified product such that imitation or modified products may be detected by failing the validation protocol.

Further, the validation protocol implemented in examples described herein may use an LBIST circuit. An LBIST circuit may be implemented in an IC die and/or IP block of the IC die to test functionality of logic in the IC die and/or IP block in a built-in self-test mode. The LBIST circuit may be used to implement the validation protocol. Based on various controls, such as initial seed, initial signature value, etc. depending on the LBIST circuit, the LBIST circuit may be deterministic in its response. Hence, a prompt of a query (which may initialize the LBIST circuit) may result in a known response. The larger the number of bits used to initialize the LBIST circuit (whether by initial seed, initial signature value, or other control) may result in a larger number of deterministic responses, and hence, a larger number of unique query-response pairs. The responses may be specific to the design of the LBIST circuit, and the validation protocol may be difficult to mimic. Using an LBIST circuit for the validation protocol may offer an area-saving option over another solution that provides a dedicated circuit for the validation protocol. An LBIST circuit may be implemented on an IC die for BIST purposes, and using the LBIST circuit for the validation protocol may avoid adding significant circuits in the IC die. Further, an LBIST approach may be implemented in design pathways that are orthogonal to functional pathways in the IC die and/or IP block, so timing impacts in the IC die and/or IP block may be reduced. Other advantages or benefits may be achieved by various examples.

FIG. 1 is a schematic view of an IC die 100 according to some examples. The IC die 100 includes an external interface 102, an IP block 104, and an LBIST circuit 106. The external interface 102 may connect with and form a communication path with an external device. The IP block 104 includes the LBIST circuit 106. A communication path is between the interface 102 and the IP block 104, and more particularly, the LBIST circuit 106. The LBIST circuit 106 is implemented on the IC die 100 to perform a built-in self-test of logic in a built-in self-test mode and to validate the authenticity of the IC die 100 and/or IP block 104 in a normal functional mode.

For authenticity validation, the IC die 100 is configured to receive at the interface 102 a query challenging authenticity. The query is then transmitted, via a communication path, to the IP block 104 (and further, the LBIST circuit 106), which receives the query. The LBIST circuit 106 is configured to generate a response to the query. The IP block 104 (and more particularly, the LBIST circuit 106) transmits the response via the communication path to the interface 102, and from the interface 102, the response is further transmitted from the IC die 100. An external device (e.g., external to the IC die 100) may transmit the query and receive the response. The external device may, upon receiving the response, compare the response to an expected response (based on the query) to determine whether authenticity of the IC die 100 or IP block 104 has been properly validated. If the response is not what was expected based on the query, the authenticity of the IC die 100 or IP block 104 has not been validated, and if the response is what was expected, the authenticity of the IC die 100 or IP block 104 has been validated.

Figure 2:
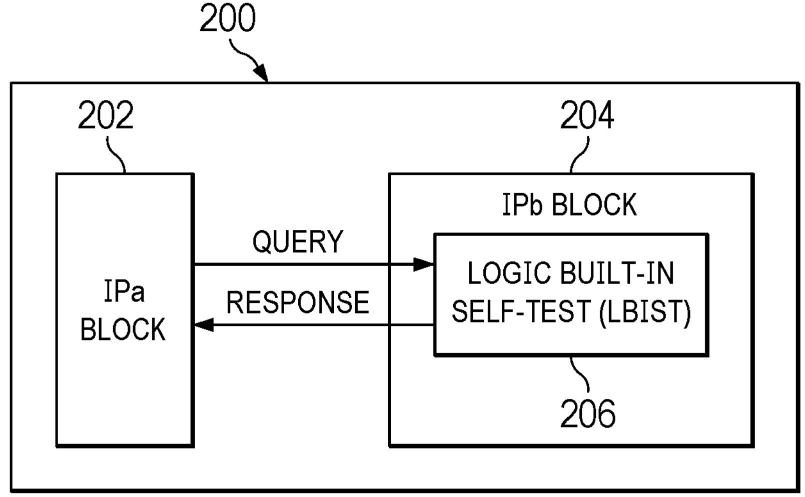
FIG. 2 is a schematic view of an IC die according to some examples.

FIG. 2 is a schematic view of an IC die 200 according to some examples. The IC die 200 includes a first IP (IPa) block 202, a second IP (IPb) block 204, and an LBIST circuit 206. The IPb block 204 includes the LBIST circuit 206. A communication path is between the IPa block 202 and the IPb block 204 (and more particularly, the LBIST circuit 206). The LBIST circuit 206 is implemented on the IC die 200 to perform a built-in self-test of logic in a built-in self-test mode and may also be used to validate the authenticity of the IPb block 204.

For authenticity validation, the IPa block 202 is configured to generate a query challenging authenticity and to transmit the query to the IPb block 204 through the communication path. The IPb block 204 is configured to receive the query, which is further transmitted inside the IPb block 204 to the LBIST circuit 206. The LBIST circuit 206 is configured to generate a response to the query. The LBIST circuit 206 transmits the response, which is further transmitted from the IPb block 204 to the IPa block 202 through the communication path. The IPa block 202 may, upon receiving the response, compare the response to an expected response (based on the query) to determine whether authenticity of the IPb block 204 has been properly validated. If the response is not what was expected based on the query, the authenticity of the IPb block 204 has not been validated, and if the response is what was expected, the authenticity of the IPb block 204 has been validated.

Figure 3:
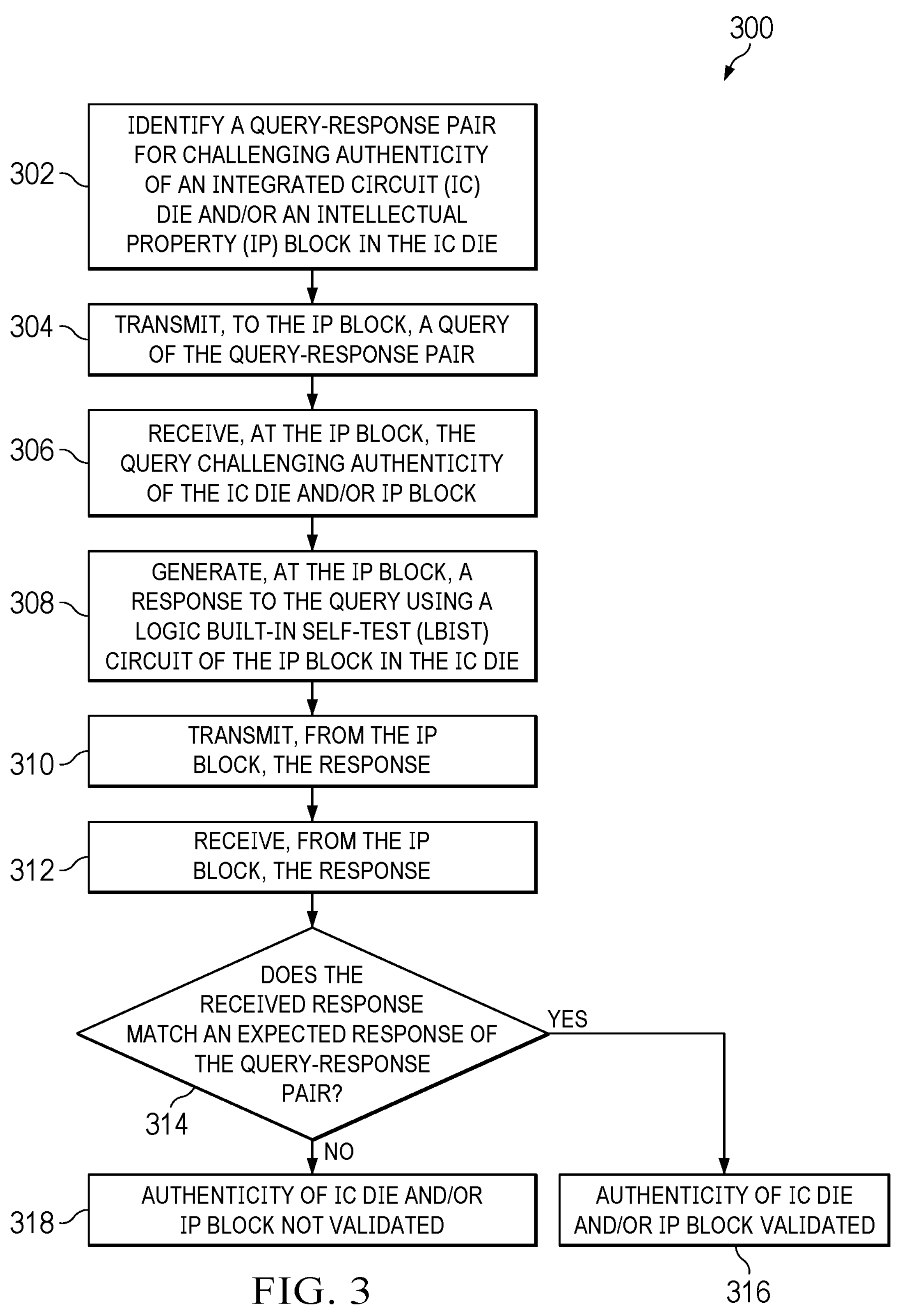
FIG. 3 is a flowchart of a method of validating authenticity of an IC die according to some examples.

FIG. 3 is a flowchart of a method 300 of validating authenticity of an IC die and/or IP block according to some examples. At block 302, a query-response pair for challenging the authenticity of an IC die and/or an IP block in the IC die is identified. The query-response pair may be provided by a design entity that designed the IC die and/or IP block. The design entity may have knowledge of the LBIST circuit and a validation protocol implemented by the LBIST circuit, and hence, may generate one or more unique query-response pairs for challenging the authenticity of the IC die and/or IP block. Each query has an associated expected response that indicates authenticity. Each query may be unique from other queries, and each expected response may be unique from other expected responses. In some examples, the design entity may provide one or more of the query-response pairs to a user (e.g., an end user) of the IC die, and the user may then identify the query-response pair at block 302. In some examples, the query-response pair may be programmed into another IP block within the same IC die, and that IP block may identify the query-response pair at block 302.

At block 304, a query of the query-response pair is transmitted to the IP block, and at block 306, the query challenging the authenticity of the IC die and/or IP block is received at the IP block. In some examples, the query may originate from and be transmitted from an external device (e.g., external to the IC die) to the IC die. Once received at the IC die, the query may then be transmitted internally in the IC die to the IP block in the IC die. In some examples, the query may originate from another IP block in the IC die, and the other IP block may transmit the query internally in the IC die to the IP block that receives the query. The query may be transmitted and the response received at any point in the supply chain of the IC die. For example, the query may be transmitted and the response received via testing the IC die upon taking possession of the IC die from the manufacturer. The query may be transmitted and the response received via testing the IC die before packaging the IC die in an IC package. The query may be transmitted and the response received via testing after outsourced assembly and test (OSAT). The query may be transmitted and the response received after the IC die is deployed in the field to a field application to ensure that the proper IC die is actually being implemented or to build trust with the IC die and/or IP block, e.g., after some credentials have been compromised. The query may be transmitted from any circuit that may request validation of authenticity, such as from testing equipment (e.g., in various testing stages in the supply chain), from another IC die packaged with the IC die, from another IP block within the IC die, from another package communicating with the IC die, from field test equipment, etc.

At block 308, a response to the query is generated at the IP block using an LBIST circuit of the IP block in the IC die. In some examples, the content of the query is routed to the LBIST circuit, and the LBIST circuit generates the response based on the content of the query. In some examples, another circuit(s), such as a central processing unit (CPU) or another IP block, of the IC die may generate input data, such as scan-in data, that is routed to the LBIST circuit, which generates output data, such as scan-out data, and another circuit(s) may generate the response based on the output data from the LBIST circuit. Further, in some examples, another circuit(s) in the IC die may initialize the LBIST circuit to a state based on the query. Various permutations of how the LBIST circuit may operate with another circuit(s) within the IC die to receive the query and to generate a response may be implemented.

At block 310, the response is transmitted from the IP block, and at block 312, the response is received from the IP block. The response may be received by the same circuit that transmitted the query at block 304. The recipient may be a security master or security enforcement mechanism. At block 314, a determination of whether the received response matches an expected response of the query-response pair is made. The circuit transmitting the query may make this determination with knowledge of the query-response pair in some examples. In some examples, a user or external device may make this determination. If the determination is that the response matches the expected response, authenticity of the IC die and/or the IP block in the IC die is validated at block 316. If the determination is that the response does not match the expected response, authenticity of the IC die and/or the IP block in the IC die is not validated at block 318.

Figure 4:
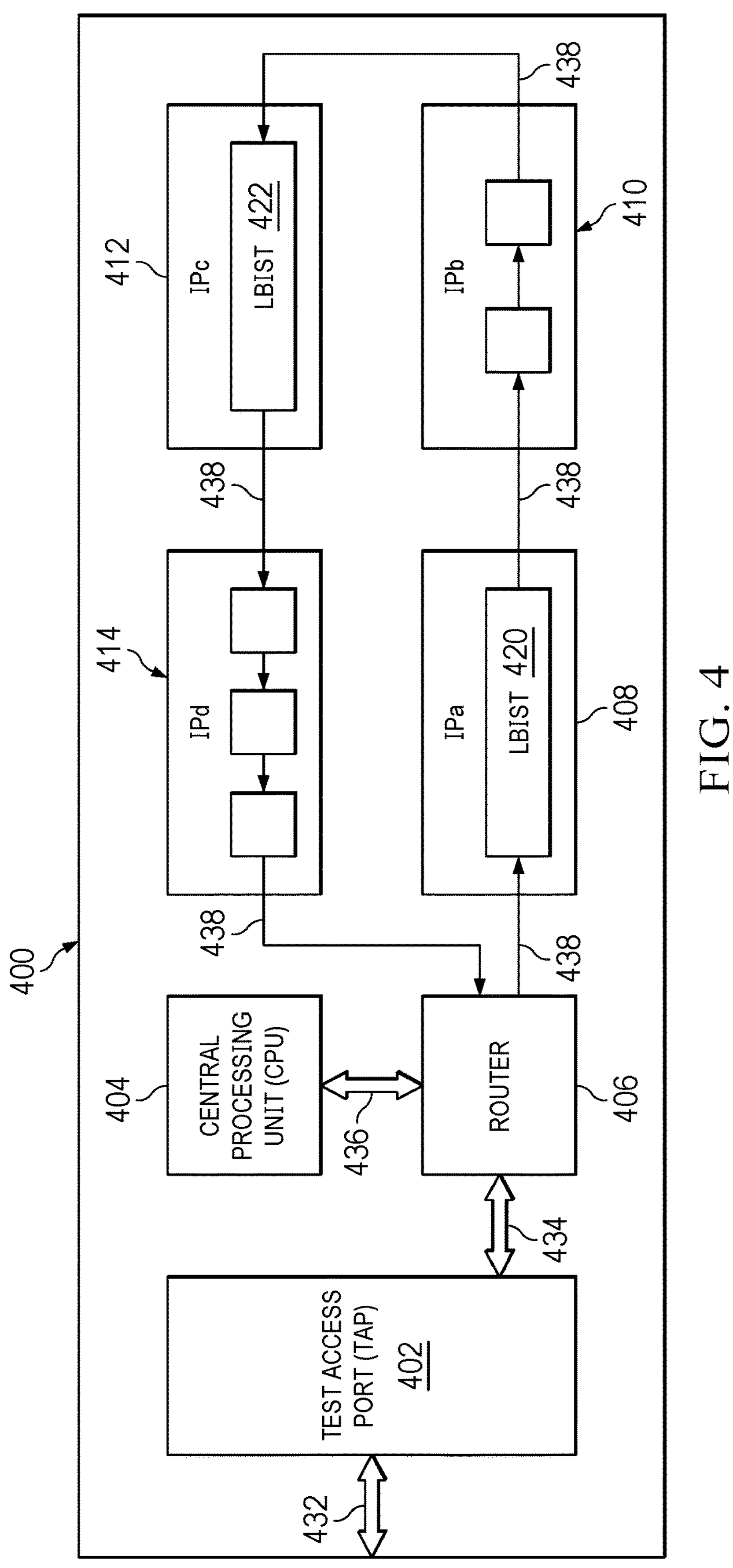
FIG. 4 is a block diagram of an IC die according to some examples.

FIG. 4 is a block diagram of an IC die 400 according to some examples. The IC die 400 is or includes a System-on-Chip (SoC). The IC die 400 illustrates aspects by which a query challenging authenticity may originate and be received from an external device and by which a query challenging authenticity may originate within the IC die 400.

The IC die 400 includes an interface to an external device and communication paths internal to the IC die 400. When the query-response protocol is initiated by an external device, the interface of the IC die 400 may be a channel through which the IC die 400 receives a query from the external user or device. The communication path(s) may be a channel through which the query is transmitted or communicated to an appropriate IP block where an LBIST circuit generates a response. The response is then transmitted or communicated through the communication path(s) to the interface and out of the IC die 400 to the external device.

When the query-response protocol is initiated internal to the IC die 400, an initiating IP block in the IC die 400 may originate a query, which is transmitted or communicated via the communication path(s) to an appropriate IP block where an LBIST circuit generates a response. The response is then transmitted or communicated through the communication path(s) to the initiating IP block in the IC die 400.

More specifically, as illustrated in FIG. 4, the IC die 400 includes a test access port (TAP) block 402 as the interface to an external user or device, although the interface may be any interface configured to receive and transmit communications to an external device. The IC die 400 also includes various IP blocks, including a central processing unit (CPU) 404, a router 406, and IP (IPa, IPb, IPc, and IPd) blocks 408, 410, 412, 414. IPa block 408 and IPc block 412 each include a respective LBIST circuit 420, 422. The IC die 400 includes (i) a communication path 432 between the TAP block 402 and an external physical interface of the IC die 400, (ii) a communication path 434 between the TAP block 402 and the router 406, (iii) a communication path 436 between the CPU 404 and the router 406, and (iv) communication paths 438 between the router 406 and IP blocks 408-414. In some examples, the TAP block 402 may implement the Institute of Electrical and Electronics Engineers (IEEE) 1149.1 standard. In some examples, the communication path 436 may implement the Advanced Peripheral Bus (APB) protocol. The router 406 and communication paths 438 may implement any interconnect and routing infrastructure. More generally, a communication path may be from the interface of the IC die 400, which may be coupled to an external device. This communication path may carry the query-response pair when the external device initiates the query. Further, communication paths may be included in the IC die 400 that carry the query-response pair, whether the query is initiated externally or internally. The communication paths in the IC die 400 may route a query and a response to appropriate IP block(s).

A query-response protocol for challenging the authenticity of the IC die 400 may be accessed external from the IC die 400 and/or internal to the IC die 400. For example, a query may be received from an external source via the communication path 432 through the TAP block 402, and similarly, a response may be transmitted from the IC die 400 via the TAP block 402 and the communication path 432 to the external source. As another example, a query may be initiated by the CPU 404, and the CPU 404 may access the query-response protocol based on that query. The CPU 404 may receive the response to validate in such an example.

The communication paths 438 may be or include routing infrastructure for communicating with one or more of the IP blocks 408-414 and/or between various IP blocks 408-414. Data for validating authenticity by the LBIST circuits 420, 422 may be communicated to or between the IP blocks 408-414 on the communication paths 438. Data generated by the LBIST circuits 420, 422 in response to received data for validating authenticity may further be communicated from or between the IP blocks 408-414 on the communication paths 438. FIG. 4 illustrates the communication paths 438 from the router 406 to the LBIST circuit 420 of the IPa block 408, from the LBIST circuit 420 of the IPa block 408 to blocks of the IPb block 410, from a block of the IPb block 410 to the LBIST circuit 422 of the IPc block 412, from the LBIST circuit 422 of the IPc block 412 to blocks of the IPd block 414, and from a block of the IPd block 414 to the router 406. These communication paths 438 are merely an example, and other routing infrastructure may be implemented.

A query may have any format to invoke the query-response protocol. Data within the query may be or include a prompt to which an LBIST circuit of the IP block may generate a response. In some examples, the prompt may be or include scan-in data used to initialize the LBIST circuit. In some examples, the query may trigger another circuit to transmit to and/or initialize the LBIST circuit with a prompt stored within the IC die, such as in non-volatile memory. In some examples where a prompt is stored within the IC die, multiple prompts may be stored within the IC die, and a query may indicate which prompt is to be implemented in the validation protocol (e.g., like in a look-up table (LUT)).

Figure 5:
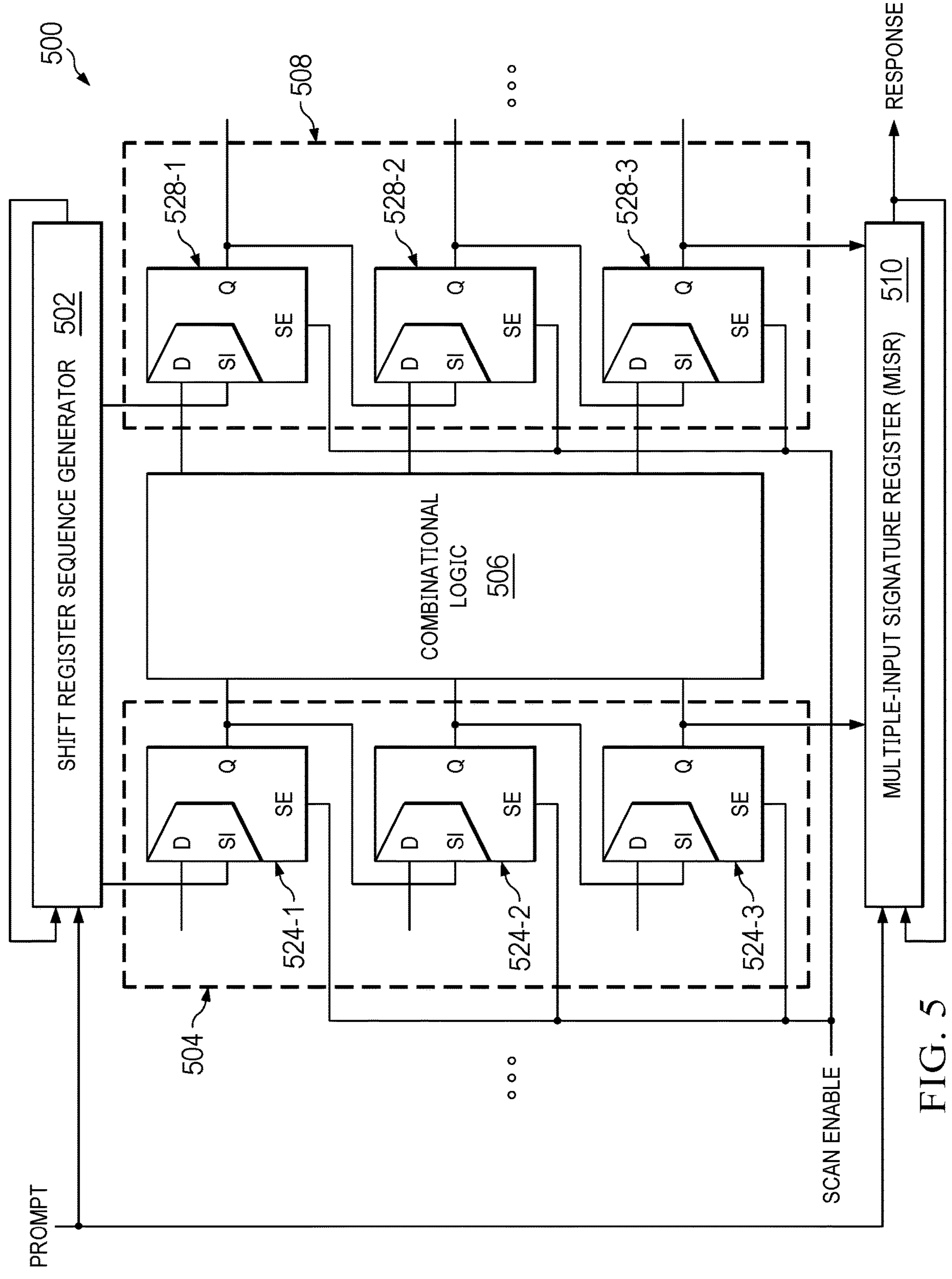
FIG. 5 is a schematic of a logic built-in self-test (LBIST) circuit according to some examples.

FIG. 5 is a schematic of an LBIST circuit 500 according to some examples. The LBIST circuit 500 of FIG. 5 may be a portion of a larger LBIST circuit, and the portion shown in FIG. 5 is shown simplistically to not obscure aspects described herein. As described in detail, the LBIST circuit 500 is configured to selectively operate in a built-in self-test mode and a normal functional mode.

The LBIST circuit 500 includes a shift register sequence generator circuit 502, a multiplicity of scan chains (including scan chains 504, 508), functional logic (including combinational logic 506), and a multiple-input signature register (MISR) 510. Example scan chain 504 includes scan flip flops 524-1, 524-2, 524-3, and example scan chain 508 includes scan flip flops 528-1, 528-2, 528-3. Other scan chains likewise include scan flip flops, and the respective scan chains may include any number of scan flip flops. A respective output node (e.g., tap) of the shift register sequence generator circuit 502 is connected to a scan input node of the scan chain 504, and another respective output node (e.g., tap) of the shift register sequence generator circuit 502 is connected to a scan input node of the scan chain 508. Respective output nodes of the shift register sequence generator circuit 502 may likewise be connected to respective scan input nodes of other scan chains. An output node of the scan chain 504 is connected to a respective input node of the MISR 510, and an output node of the scan chain 508 is connected to another respective input node of the MISR 510. Output nodes of other scan chains may likewise be connected to respective input nodes of the MISR 510.

In the scan chain 504, the scan input node (SI) of the scan flip flop 524-1 is the input node of the scan chain 504 connected to an output node of the shift register sequence generator circuit 502. The output node (Q) of the scan flip flop 524-1 is connected to an input node of the combinational logic 506 and to the scan input node (SI) of the scan flip flop 524-2. The output node (Q) of the scan flip flop 524-2 is connected to an input node of the combinational logic 506 and to the scan input node (SI) of the scan flip flop 524-3. The output node (Q) of the scan flip flop 524-3 is connected to an input node of the combinational logic 506 and is the output node of the scan chain 504 connected to the respective input node of the MISR 510. The data input nodes (D) of the scan flip flops 524-1, 524-2, 524-3 may be connected to respective output nodes of preceding functional combinational logic (not shown).

In the scan chain 508, the scan input node (SI) of the scan flip flop 528-1 is the input node of the scan chain 508 connected to an output node of the shift register sequence generator circuit 502. The output node (Q) of the scan flip flop 528-1 is connected to the scan input node (SI) of the scan flip flop 528-2. The output node (Q) of the scan flip flop 528-2 is connected to the scan input node (SI) of the scan flip flop 528-3. The output node (Q) of the scan flip flop 528-3 is the output node of the scan chain 508 connected to the respective input node of the MISR 510. The data input nodes (D) of the scan flip flops 528-1, 528-2, 528-3 are connected to respective output nodes of the combinational logic 506. The output nodes (Q) of the scan flip flops 528-1, 528-2, 528-3 may be connected to respective input nodes of subsequent combinational logic (not shown).

The LBIST circuit 500 further includes a Scan Enable node connected to respective scan enable input nodes (SE) of the scan flip flops 524-1, 524-2, 524-3, 528-1, 528-2, 528-3. In operation, when a Scan Enable signal on the Scan Enable node is logically high (e.g., a logical '1' value), the scan flip flops 524-1, 524-2, 524-3, 528-1, 528-2, 528-3 may be operated in a shift state of the built-in self-test mode. When the Scan Enable signal is logically low (e.g., a logical '0' value), the scan enable input nodes (SE) of the scan flip flops 524-1, 524-2, 524-3, 528-1, 528-2, 528-3 are logically low to multiplex the data on the respective data (D) input node to the output node (Q) in a functional mode. Further, various signals and controls may be implemented by different circuits. The pattern of scan chains and combination logic, as illustrated by the scan chains 504, 508 and combinational logic, may be repeated in the LBIST circuit 500.

In a built-in self-test mode, a pattern of bits may be generated by the shift register sequence generator circuit 502 and captured by the scan chains, including scan chains 504, 508. The pattern of bits may be propagated through the scan flip flops of the scan chains, including scan flip flops 524-1, 524-2, 524-3, 528-1, 528-2, 528-3, by selecting the data on the scan input nodes (SI) by the respective multiplexers to output on the output nodes (Q). The data on the output nodes (Q) is input into respective combinational logic (e.g., data on the output nodes (Q) of the scan chain 504 is input into the combinational logic 506), and the resulting data output by the combinational logic may be captured by respective scan chains (e.g., data output by the combinational logic 506 may be captured by the scan chain 508). The output data from combinational logic may be captured by a scan chain by selecting the data on the data input nodes (D) of the scan flip flops of the scan chain by the respective multiplexers to store and output that data on the output nodes (Q). The data may subsequently be propagated through the scan flip flops of the scan chain by selecting the data on the scan input nodes (SI) by the respective multiplexers to store and output on the output nodes (Q). Data propagated through the scan chains, including the scan chains 504, 508, may be captured by the MISR 510, which may be scanned out. The data input to combinational logic (e.g., combinational logic 506) and data output by the combinational logic may therefore be captured and compared to determine if operation of the combinational logic was correct. Hence, the logic between the shift register sequence generator circuit 502 and multiple-input signature register (MISR) 510 may be a circuit under test in the LBIST circuit 500.

In a test or authentication mode, the LBIST circuit 500 operates as described above. In such operation, the signature value captured by the MISR 510 may be deterministic based on an initial seed of the shift register sequence generator circuit 502, the initial signature value of the MISR 510, and any other operational controls (e.g., for clocking, data capture, etc.). Once the signature value of the MISR 510 becomes deterministic, the LBIST circuit 500 may be used to validate the authenticity of the IC die and/or IP block that includes the LBIST circuit 500.

For example, the shift register sequence generator circuit 502 may be a linear feedback shift register. The shift register sequence generator circuit 502 may be written with an initial seed from bits of the prompt of the query, and similarly, the MISR 510 may be written with an initial signature value from bits of the prompt of the query. After a known number of clock cycles, a known pattern of bits propagates through the scan chains 504, 508; this data flows through the combinational logic 506, and is then captured in scan chains 504, 508; and shifted out which is captured by the MISR 510 as the signature value. This process may repeat more than once. The signature value is then scanned out. Since the operation of the LBIST circuit 500 is controlled by a known protocol, the signature value scanned out from the MISR 510 may be deterministic.

Accordingly, a query challenging authenticity of an IC die and/or IP block in the IC die may include a prompt. The prompt may include various data, such as an initial seed (e.g., for a shift register sequence generator circuit 502), an initial signature value (e.g., for a MISR 510), and any other control data. The control data may be any data to control the LBIST circuit 500 to be deterministic. Hence, based on the prompt and the deterministic operation of the LBIST circuit 500, an expected response may be known. If the IC die and/or IP block that includes the LBIST circuit 500 is authentic, the response (e.g., the scanned out signature value from the MISR 510) should match the expected response associated with the query. The more bits in the shift register sequence generator circuit 502 and the MISR 510 and/or the more control data the LBIST circuit 500 includes, the more unique query-response pairs that may be available for challenging the authenticity of an IC die and/or IP block.

As indicated, the shift register sequence generator circuit 502 may be or include a linear feedback shift register. In other examples, the shift register sequence generator circuit 502 may be or include a nonlinear feedback shift register circuit, a cellular automata shift register circuit, a cryptographic hash function circuit, a message authentication code (MAC) circuit, or a combination thereof. Any circuit that is configured to generate a pattern of data deterministically may be implemented as the shift register sequence generator circuit 502.

Figure 6:
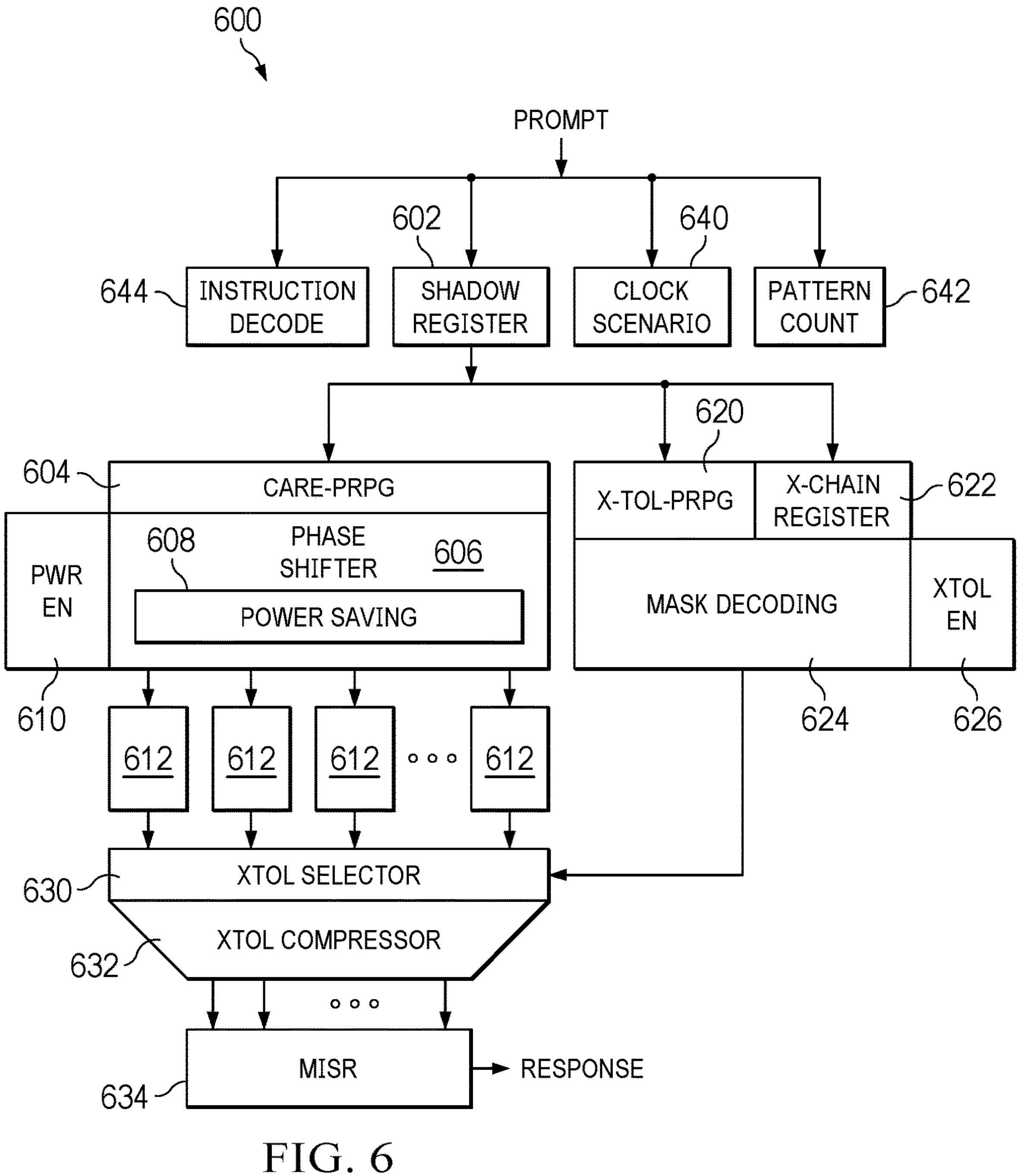
FIG. 6 is a schematic of an indeterminant value (X) tolerant LBIST circuit according to some examples.

FIG. 6 is a schematic of an indeterminant value (X) tolerant LBIST circuit 600 according to some examples. The X-tolerant LBIST circuit 600 is an example LBIST circuit that may be implemented to validate authenticity of an IC die. Other X-tolerant LBIST circuits, or more generally, other LBIST circuits, may be implemented. A circuit under test's combinational logic that is to be tested in a built-in self-test mode of the X-tolerant LBIST circuit 600 is not illustrated in FIG. 6 so as not to obscure other aspects described herein.

The X-tolerant LBIST circuit 600 may be programmatically initialized based on a query or a prompt of a query, which may permit a large number of unique query-response pairs. As described in detail subsequently, the X-tolerant LBIST circuit 600 may allow programmatically initializing or selecting an initial seed, a signature value, a pattern count, a clocking selection or scenario, a capture cycle count, a power savings constraint, a static scan-out mask, and/or an initial dynamic scan-out mask.

The X-tolerant LBIST circuit 600 includes a shadow register 602. The shadow register 602 is configured to store at least some data of a prompt. The prompt may be data from a query or data generated based on a query. The prompt may, in some examples, be or include scan-in data. The shadow register 602 may store data that is in flight while other data is being operated upon by other components of the X-tolerant LBIST circuit 600.

The X-tolerant LBIST circuit 600 includes a care pseudo-random pattern generator (Care-PRPG) circuit 604. The Care-PRPG circuit 604 is a linear feedback shift register or sequencer. The Care-PRPG circuit 604 may be initialized by an initial seed in the prompt, for example. The Care-PRPG circuit 604 is configured to generate data, which may be deterministic based on the initial seed and a number of shifts performed.

The X-tolerant LBIST circuit 600 includes a phase shifter circuit 606. The phase shifter circuit 606 may include XOR gates or another circuit. The phase shifter circuit 606 is configured to receive data generated by the Care-PRPG circuit 604 and expand the data to some larger number of bits. The phase shifter circuit 606 includes a power savings circuit 608. The power savings circuit 608 is coupled to a power enable register 610. The power enable register 610 may be written with data (e.g., the power savings constraint) to control the power savings circuit 608. Based on data written to the power enable register 610, the power savings circuit 608 may deactivate respective portions of the phase shifter circuit 606 such that the phase shifter circuit 606 does not capture some bits of data from the Care-PRPG circuit 604. Hence, the power enable register 610 with the power savings circuit 608 may provide a power reduction function by stalling or making static switching activity in the phase shifter circuit 606, and thus the scan chains, for a number of cycles. The power enable register 610 and the power savings circuit 608 may provide static and/or dynamic power savings. The Care-PRPG circuit 604 and phase shifter circuit 606 together are an example of a shift register sequence generator circuit 502. The X-tolerant LBIST circuit 600 includes scan chains 612, like the scan chains 504, 508 of FIG. 5. Data from the phase shifter circuit 606 is loaded into respective scan chains 612.

The X-tolerant LBIST circuit 600 includes an X-tolerant PRPG circuit 620 and an X-chain register 622. The X-tolerant PRPG circuit 620 may be or include a linear feedback shift register. The X-tolerant PRPG circuit 620 generates a dynamic pattern of bits that may be used to mask or unmask data output from the scan chains 612 as the data is unloaded into the MISR 634. The X-tolerant PRPG circuit 620 may be deterministic based on the initial masking value (e.g., the initial dynamic scan-out mask) to which it was initialized and a number of shifts performed. The X-chain register 622 is a register that stores static bits (e.g., the static scan-out mask) that also may be used to mask or unmask data output from the scan chains 612. The X-tolerant PRPG circuit 620 and the X-chain register 622 may be initialized or written by respective portions of the prompt. The X-tolerant LBIST circuit 600 includes a mask decoding circuit 624 and an X-tolerant enable register 626. The mask decoding circuit 624 combines respective bits of the X-tolerant PRPG circuit 620 and the X-chain register 622. The X-tolerant enable register 626 may be a one bit register that enables or disables masking by the X-tolerant PRPG circuit 620 and the X-chain register 622, which enabling or disabling may be via the mask decoding circuit 624.

The X-tolerant LBIST circuit 600 includes an X-tolerant selector circuit 630. The X-tolerant selector circuit 630 masks or unmasks data from the scan chains 612 based on the combined mask bits from the mask decoding circuit 624. For example, the X-tolerant selector circuit 630 may include AND gates to mask or unmask the data from the scan chains 612. The X-tolerant LBIST circuit 600 includes an X-tolerant compressor circuit 632. The X-tolerant compressor circuit 632 receives data from the X-tolerant selector circuit 630 and compresses the received data. The X-tolerant LBIST circuit 600 includes a MISR 634. The MISR 634 receives data from the X-tolerant compressor circuit 632 and outputs the response, which may be scanned out data.

The X-tolerant LBIST circuit 600 includes a clock scenario register 640. The clock scenario register 640 can be written (e.g., by data of the prompt) to control a clocking and capture scenario in the X-tolerant LBIST circuit 600. The clocking selection or scenario and the capture cycle count may be written to the clock scenario register 640. The X-tolerant LBIST circuit 600 may include multiple clock domains, and the clock scenario register 640 can be written to select which clock domain or domains is implemented or used for various functionality of the X-tolerant LBIST circuit 600. A clock or clocks of selected clock domains may be used in a capture operation to capture data in one or more scan chains 612.

The X-tolerant LBIST circuit 600 includes a pattern count register 642. The pattern count register 642 can be written (e.g., by data of the prompt) to control when the data of the MISR 634 is shifted out as the response. The pattern count stored by the pattern count register 642 may indicate the number of times data is shifted into the scan chains 612 and captured into scan flip-flops and then scanned out and captured by the MISR 634 before requesting the response data from the MISR 634.

The X-tolerant LBIST circuit 600 includes an instruction decode circuit 644. The instruction decode circuit 644 may be or include logic that decodes data from the prompt and sets or controls various other functionality of the X-tolerant LBIST circuit 600. The instruction decode circuit 644 may manipulate how and which registers or circuits are used, for example.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

receiving, at an intellectual property (IP) block in an integrated circuit (IC) die, a query challenging authenticity, the query including a prompt;

generating, at the IP block, a response to the query using a logic built-in self-test (LBIST) circuit, generating the response including writing the prompt to the LBIST circuit; and transmitting the response from the IP block.

2. The method of claim 1, wherein the response is generated deterministically by the LBIST circuit based on the prompt in the query.

3. The method of claim 1, wherein the LBIST circuit includes a shift register sequence generator circuit and a multiple-input signature register (MISR), the prompt including an initial seed and an initial signature value, writing the prompt to the LBIST circuit including writing the initial seed to the shift register sequence generator circuit and the initial signature value to the MISR.

4. The method of claim 3, wherein the shift register sequence generator circuit includes a linear feedback shift register circuit.

5. The method of claim 3, wherein the shift register sequence generator circuit includes a nonlinear feedback shift register circuit.

6. The method of claim 3, wherein the shift register sequence generator circuit includes a cellular automata shift register circuit.

7. The method of claim 3, wherein the shift register sequence generator circuit includes a cryptographic hash function circuit.

8. The method of claim 3, wherein the shift register sequence generator circuit includes a message authentication code (MAC) circuit.

9. The method of claim 1, wherein:

the query is received at an interface of the IC die with an external device; and the response is transmitted from the IC die, via the interface, to the external device.

10. The method of claim 1 further comprising originating the query at another IP block in the IC die, wherein the response is transmitted to the other IP block in the IC die.

11. A method comprising:

transmitting, to an intellectual property (IP) block in an integrated circuit (IC) die, a query of a query-response pair for challenging authenticity, the query including a prompt;

receiving, from the IP block, a response to the query, the response being generated at the IP block using a logic built-in self-test (LBIST) circuit of the IC die, wherein generating the response includes writing the prompt to the LBIST circuit; and comparing the response to an expected response of the query-response pair, wherein authenticity is validated when the response matches the expected response.

12. The method of claim 11, wherein transmitting the query and receiving the response is performed before the IC die is packaged in an IC package.

13. The method of claim 11, wherein transmitting the query and receiving the response is performed after deploying the IC die to a field application.

14. The method of claim 11, wherein the query is transmitted to an interface of the IC die, the interface being with a device external to the IC die.

15. The method of claim 11 further comprising originating the query at another IP block in the IC die, wherein the other IP block receives the response and compares the response to the expected response.

16. The method of claim 11 further comprising generating, at the IP block, the response to the query using the LBIST circuit.

17. A method comprising:

transmitting a query of a query-response pair to an intellectual property (IP) block in an integrated circuit (IC) die, the query including a prompt;

receiving, at the IP block, the query;

generating, at the IP block, a response to the query using a logic built-in self-test (LBIST) circuit of the IC die, generating the response including writing the prompt to the LBIST circuit;

receiving, from the IP block, the response; and comparing the response to an expected response of the query-response pair.

18. The method of claim 17, wherein the LBIST circuit includes a shift register sequence generator circuit and a multiple-input signature register (MISR), the prompt including an initial seed and an initial signature value, writing the prompt to the LBIST circuit including writing the initial seed to the shift register sequence generator circuit and the initial signature value to the MISR.

19. The method of claim 17, wherein:

a device external to the IC die transmits the query to the IP block in the IC die;

the device receives the response from the IP block; and the device compares the response to the expected response.

20. The method of claim 17, wherein:

another IP block in the IC die transmits the query to the IP block in the IC die;

the other IP block receives the response from the IP block; and the other IP block compares the response to the expected response.

* * * * *